Figure 1:
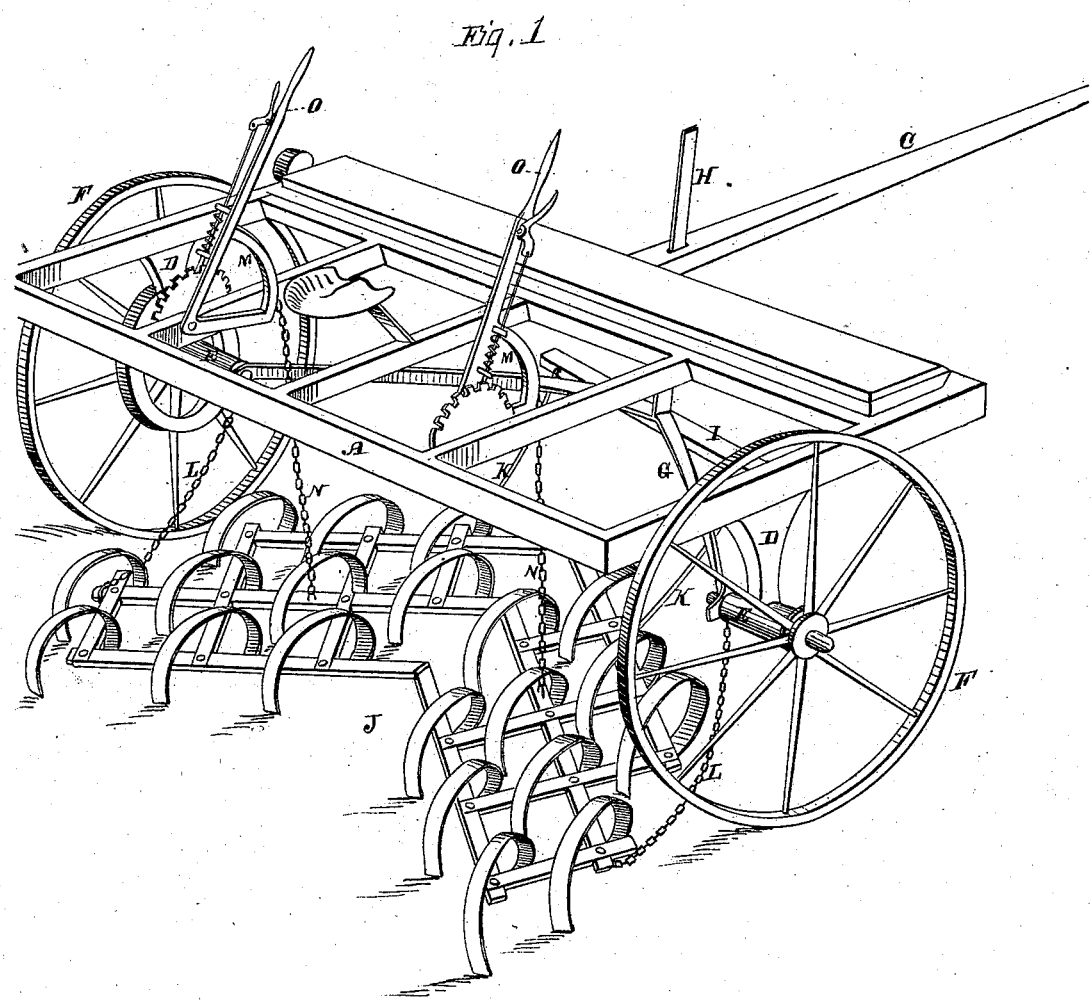

(No Model.) 2 Sheets—Sheet 1.

F. BATCHELOR.
Wheel Harrow and Seeding Machine.

No. 239,699. Patented April 5, 1881.

Witnesses
Geo. H. Strong.
Frank H. Brooks

Inventor
Frank Batchelor
By Dewey & Co.
Attys

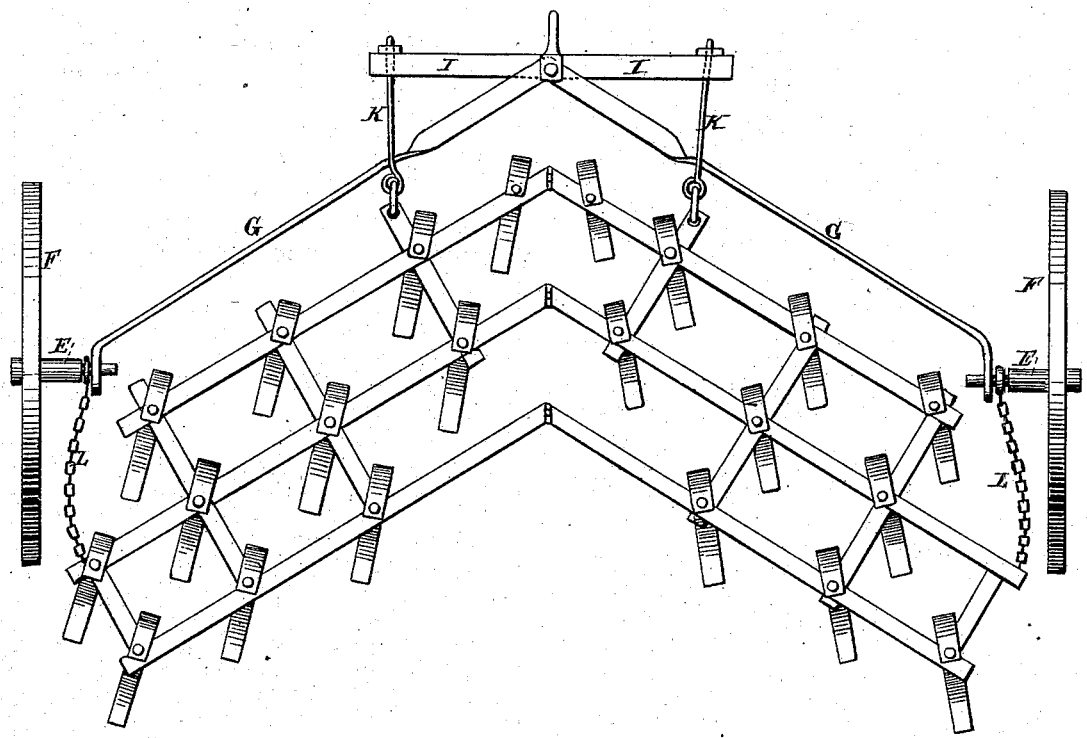

United States Patent Office.

FRANK BATCHELOR, OF SACRAMENTO, CALIFORNIA, ASSIGNOR OF ONE-HALF TO MORRIS VAN GELDER, OF SAME PLACE.

WHEEL-HARROW AND SEEDING-MACHINE.

SPECIFICATION forming part of Letters Patent No. 239,699, dated April 5, 1881.

Application filed December 27, 1880. (No model.)

*To all whom it may concern:*

Be it known that I, FRANK BATCHELOR, of the city and county of Sacramento, State of California, have invented an Improvement in Wheel-Harrows and Seeding-Machines; and I hereby declare the following to be a full, clear, and exact description thereof.

My invention relates to certain improvements in machines for cultivating or pulverizing the soil and seeding the same, and it is based upon a patent which was issued to me May 25, 1880.

It consists in the employment of a sulky or wheel frame, having independent bearing-wheels supporting it by means of hangers, and a series of harrows traveling beneath the frame and between the wheels. Stay-rods extend from the hangers forward and to the center, where they connect with a vertical adjusting-standard, and with the evener or draft-bar, which is also connected with the harrows, so that the draft is effected directly upon the center of the wheels, and also upon the harrows, independent of the wheel-frame. The draft is applied directly to the harrow as well as to the sulky, and the diagonal stay-rods from the bar enable me to dispense with the wheel shaft or axle.

Referring to the accompanying drawings for a more complete explanation of my invention, Figure 1 is a perspective view of my apparatus. Fig. 2 is a perspective view of the harrows detached.

A is the frame of my apparatus, having upon the front part a seeder of any suitable construction, which may be operated by a belt or other connection from one of the driving-wheels.

C is the pole by which the machine is guided. D D are hangers or brackets, having short wheel-shafts E secured in their lower ends. The wheels F are fitted to these shafts and support the frame. These shafts extend through the hangers, so as to project a short distance to the inside; or, if desired, the hangers themselves may be formed with suitable projections upon them, for a purpose to be hereinafter described. To these projections stay-rods G are secured, and they extend from these points to the front and center of the machine, where they meet at an obtuse angle below the pole.

A standard or bar, H, passes down through the pole just in front of the frame and unites with the stay-rods, while the draft-bar or evener I is also secured to the stay-rods, so that the machine is drawn by means of these stay-rods, which connect the bottom of the hangers with the draft-bar.

By this construction I am enabled to dispense with an axle extending across the full width of the machine, thus lessening the expense and leaving the space beneath the frame free and unincumbered. The stay-rods give a draft from the center line of the wheels, and also relieve the hangers or brackets from strain.

The harrows J may be of any suitable or desired form; but I have shown in the present case two curved spring-tooth harrows hinged together at the center, so that they will accommodate themselves to the inequalities of the ground. The harrows are set directly beneath the frame A and between the wheels, as shown in my former patent, instead of being dragged at some distance behind the sulky, and this is of great importance, as it gives me perfect control over them, and I can elevate or depress either the sides or the center directly from the sulky-frame. It also enables me to apply the draft directly to the harrows, by means of connecting chains, links, or bars K from the ends of the draft-bar I to the front ends of the harrows. The draft is thus applied to the sulky and the harrows independently, but from the same draft-bar.

The rear ends of the harrows are connected by links or chains L with the projections, before described, at the inside of the hangers, and this is an important point, as it enables me to control the rear end of the harrows and keep them from fouling the wheels when the machine is turned around, while the harrows are at the same time unimpeded in their free vertical movement. The draft of the rear ends is, by means of the chains L and stay-rods G, applied directly from the draft-bar.

In order to elevate and depress the rear ends of the harrows, so that either one or both sides may be regulated, two segments, M, have their centers supported upon the frame at points above the harrows, and chains N are secured to the harrows and to the peripheries of the segments, so that by turning the latter the harrows will be elevated or depressed.

Levers O serve to operate the segments, and a suitable rack and pawl, P, for each holds the harrow at the desired point of elevation. As they are hinged together at the center, they will accommodate themselves to any irregularities of the surface, and I am enabled to elevate either side independent of the other by means of the levers O. The front of the harrows is elevated or depressed by the standard H, as shown in my former patent.

Having thus described my invention, what I claim as new, and desire to secure by Letters Patent, is—

The hinged or jointed harrows J, loosely suspended between the wheels and beneath the frame of a sulky, and adjusted from the frame by the suspending-chains, segments, and levers, as shown, said harrows having the front ends connected with the draft-bar I by the links K, and the rear ends connected with the hangers by chains L, the hangers or projections therefrom being also connected with the draft-bar and standard H by the stay-rods G, whereby the harrows are brought close to the power and are drawn by the same draft-bar, but independently of the sulky, substantially as herein described.

In witness whereof I have hereunto set my hand.

FRANK BATCHELOR.

Witnesses:
ADD. C. HINKSON,
J. H. WYLIE.